J. T. LINDSTROM AND H. R. DEILEY.
DIRECTION INDICATOR.
APPLICATION FILED APR. 30, 1919.
1,351,774.
Patented Sept. 7, 1920.
2 SHEETS—SHEET 1.
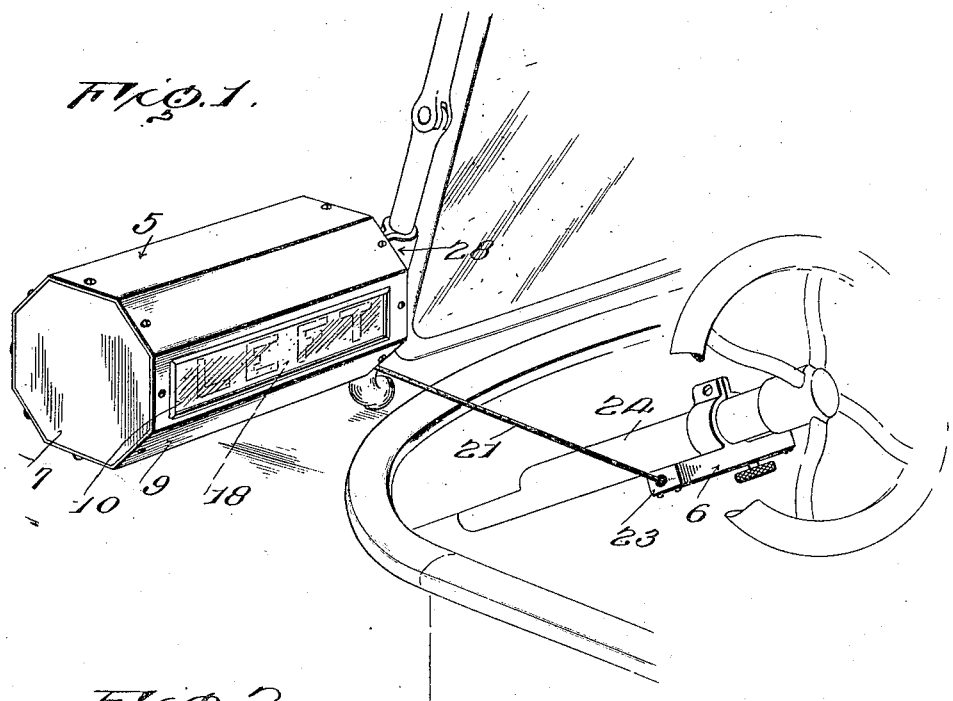
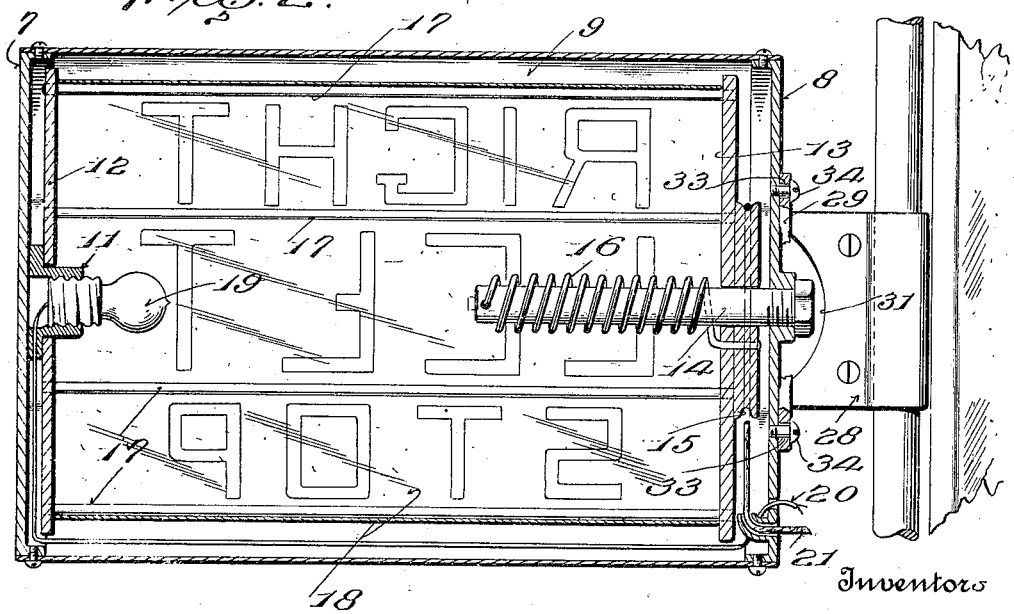

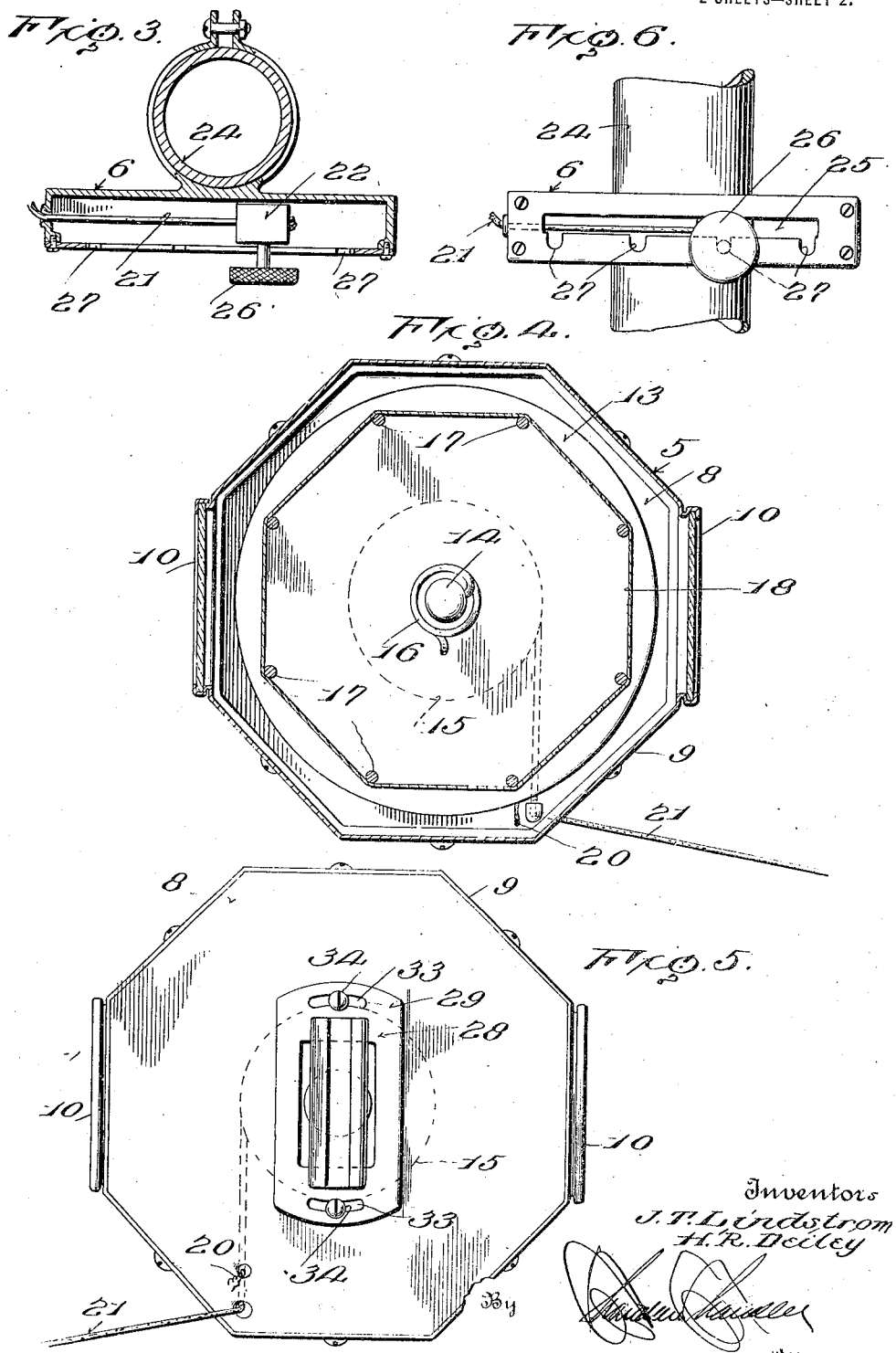

UNITED STATES PATENT OFFICE.

JOHN T. LINDSTROM, OF ALLENTOWN, AND HARVEY R. DEILEY, OF BETHLEHEM, PENNSYLVANIA; SAID DEILEY ASSIGNOR TO SAID LINDSTROM.

DIRECTION-INDICATOR.

1,351,774.

Specification of Letters Patent.

Patented Sept. 7, 1920.

Application filed April 30, 1919. Serial No. 293,803.

*To all whom it may concern:*

Be it known that we (1) JOHN T. LINDSTROM and (2) HARVEY R. DEILEY, citizens of the United States, residing at (1) Allentown and (2) Bethlehem, respectively in the counties of Lehigh and Northampton, respectively, State of Pennsylvania, have invented certain new and useful Improvements in Direction-Indicators; and we do hereby declare the following to be a full, clear, and exact description of the invention, such as will enable others skilled in the art to which it appertains to make and use the same.

This invention relates to indicators, and more particularly to direction indicators for automobiles and other vehicles, and has for its object to provide a simple, cheap and practicable device which may be attached to a vehicle and by means of which an intended operation on the part of the driver of the vehicle may be indicated to traffic both in the front and in the rear of the vehicle.

Another object is to provide a device of this kind which may be readily attached to a vehicle, which will be extremely light, and which may be controlled from the driver's seat.

Other objects and advantages will be apparent from the following description.

In the drawings:

Figure 1 is a perspective view of a portion of an automobile with the present invention attached thereto.

Fig. 2 is an enlarged longitudinal section through the indicator housing.

Fig. 3 is a section through the steering post of a vehicle and the slide bracket of the present device.

Fig. 4 is a section taken at right angles to Fig. 2.

Fig. 5 is an elevational view of the drum at one end of the rotating indicator body.

Fig. 6 is an elevation of the slide bracket showing the actuating handle, and notches engaged thereby.

Referring now to the drawings, the present invention includes an indicator proper shown at 5 on the drawings, and an operating device shown at 6. The indicator includes a housing which consists of two polygonal end plates, indicated at 7 and 8 to the peripheral edge portions of which there is secured a correspondingly formed opaque band or covering plate 9, through diametrically opposite flat portions of which there are formed sight openings 10.

Centrally of the end plate 7 and extending inwardly therefrom, there is an electric lamp socket indicated at 11, which also serves as a trunnion upon which is mounted one end plate 12 of a rotating indicator body located within the housing. The indicator includes a second end plate 13, rotatably mounted upon a shaft 14 secured centrally in the end plate 8 and extending within the housing along the axis thereof. The plate 13 lies spaced from the end plate 8, as shown, and secured to that face of the plate 13 next the plate 8, there is a drum 15, concentric with the shaft 14. A spring 16 is coiled about the shaft, and at one end this spring is fixed to the shaft while at its opposite end it is engaged with the end plate 13. The two end plates are connected by rods 17, to form the frame work of the indicating body and the spring 16 tends to turn this indicating body yieldably in one direction.

The rods 17 are spaced from each other as shown, and engaged about these rods there is a translucent band 18 which, by reason of the spacing of the rods 17 has a plurality of flat areas extending between the rods. On diametrically opposite flat areas of the band, there are inscribed similar indicating characters which may be the words "Right," "Left," "Stop," etc. These indicating characters may be either inscribed upon the band in opaque paint, or the band may be coated with opaque paint, leaving the characters blank.

In the socket 11 there is located a lamp 19 the light rays from which pass through the sight openings 10, thus illuminating the signals exposed through these openings. A suitable electric circuit indicated at 20 is provided for this lamp.

Secured at one end to the drum 15 there is a pull cord 21 normally wound upon the drum by the action of the spring 16. This cord 21 passes out through the end plate 8 and is attached to a slide 22 mounted in a casing 23, in which it is slidable, and which may be secured to the steering post 24 of a vehicle.

The casing 23 has a longitudinal slot 25 therein through which projects a finger piece 26 carried by the slide 22, and there are a plurality of notches 27 at one side of the slot 25, these notches being adapted to receive the finger piece 26 therein to hold the slide with the rotating indicating member at different points of its rotation, and against the action of the spring 16.

It will of course be understood that, as the slide is moved in one direction, the cord 21 is unwound from the drum 15 and the indicating body is rotated against the action of the spring 16 to expose the desired signals through the sight openings 10. When the slide is moved in the opposite direction, the spring 16 will move the indicating body oppositely.

Carried by the outer face of the end plate 8 there is an attaching bracket 28 including a plate 29 engaged against the end plate 8 parallel therewith and an attaching member extending outwardly from this plate. The attaching member is cut away to provide a recess 31 for the accommodation of the outer end of the shaft 14 and its clamping nut. The plate 29 has arcuate slots 33 therein through which there are engaged screws 34 engaged into the plate 8. Thus the housing may be shifted with respect to the bracket to bring the sight openings 10 into vertical position.

What is claimed is:

A direction indicator including a housing having a side opening, heads closing the ends of the housing, a movable indicator in the housing, and a supporting bracket positioned in axial alinement with the housing and having a head fitting against one head of the housing and provided with arcuate slots, and securing screws passing through the slots to adjustably connect the bracket head with the casing head and releasably hold the bracket in an adjusted position and limit turning movement of the bracket.

In testimony whereof, we affix our signatures, in the presence of two witnesses.

JOHN T. LINDSTROM.
HARVEY R. DEILEY.

Witnesses:
CHAS. L. WALTERS,
ERWIN M. FREED.